United States Patent [19]

Furuta

[11] Patent Number: 4,789,818
[45] Date of Patent: Dec. 6, 1988

[54] DC VOLTAGE CONVERTER

[75] Inventor: Masami Furuta, Kawasaki, Japan

[73] Assignee: Fuji Electric Co., Ltd., Kawasaki, Japan

[21] Appl. No.: 136,740

[22] Filed: Dec. 22, 1987

[51] Int. Cl.⁴ ............................................... G05F 1/565
[52] U.S. Cl. ..................................... 323/285; 323/286; 323/287
[58] Field of Search ............... 323/282, 284, 285, 286, 323/287

[56] References Cited

U.S. PATENT DOCUMENTS

| | | | |
|---|---|---|---|
| 3,585,491 | 6/1971 | Petersen | 323/286 |
| 4,293,812 | 10/1981 | Kubach et al. | 323/286 |
| 4,380,729 | 4/1983 | Kaku et al. | 323/285 |
| 4,580,089 | 4/1986 | Grüsch et al. | 323/285 |

Primary Examiner—Peter S. Wong
Attorney, Agent, or Firm—Spencer & Frank

[57] ABSTRACT

A DC voltage converter comprising: a switching transistor for establishing a load current circuit which connects a DC power source to a load to supply a load current to the load; a differentiating circuit connected in series to the load current circuit for producing a voltage drop corresponding to a differentiated value of the load current; an integrating capacitor connected in parallel with the load via an output terminal for outputting as an output voltage to be supplied to the load a voltage corresponding to an integrated value of a current flowing through the capacitor; a control width setting circuit for setting a width defined by upper and lower limits for controlling the output voltage in accordance with the voltage drop derived from the differentiating circuit; a ripple detection circuit receiving the output voltage from the capacitor and for detecting a ripple caused by an "ON-OFF" operation of the switching transistor; an output-reference-level setting circuit for setting a reference voltage of the output voltage; and a switching control circuit receiving a width signal corresponding to the width and a ripple signal corresponding to the ripple for forming a switching instruction to the switching transistor, so that a variation in the output voltage is limited within the width.

5 Claims, 3 Drawing Sheets

DC VOLTAGE CONVERTER

BACKGROUND OF THE INVENTION

1. Field of the Invention

The present invention relates to a DC voltage converter for deriving a DC voltage with a high degree of accuracy from a DC power supply whose voltage is liable to vary, based on a so-called step-down voltage chopper principle and more particularly to a so-called step-down voltage chopper type DC-DC converter.

2. Description of the Prior Art

In the voltage converter of the type described above, an output voltage is limited only to a voltage lower than a power supply voltage, but this voltage converter has been widely used as a DC constant voltage power source in various electronic equipment and circuits, not only because its operation principle is simple but also because the converter is relatively simple in circuit arrangement. From a practical viewpoint, however, its operation performance and stability are not satisfactory. Furthermore, there is a problem that the circuit arrangement is not so simple to arrange as a constant voltage power source suitable for mass production, so that its cost is still expensive. The above and other problems encountered in the prior art step-down voltage chopper type DC-DC converter will be briefly described below with reference to FIGS. 1 and 2 for the sake of better understanding of the present invention.

In FIG. 1, a circuit portion surrounded by the dash-and-dotted lines represents a voltage converter of the type described above. The voltage Ei of a power source 1 is supplied to the converter as indicated by the broken lines, so that a constant voltage Eo is applied to a load 2. In the voltage converter as a load power source circuit inserted between the power supply 1 and the load 2, a switching transistor 3 and a reactor 4 are connected in series to each other. Thus, even if the power source voltage Ei varies, the voltage drop across the terminals of the reactor 4 compensates for a variation in the power source voltage Ei, so that the constant voltage Eo is applied across the load 2. On the output side, a capacitor 5 having a relatively large capacitance is connected in parallel with the load 2, so that the output voltage Eo is stabilized. Reference numeral 6 represents a so-called free wheeling diode which is rendered to be conductive when the switching transistor 3 is interrupted, so that the energy stored in the reactor 4 is supplied as a current to the load 2.

In FIG. 1, reference numeral 7 designates a reference power source for producing a reference voltage E to be used to set the output voltage level Eo. Two resistors 8a and 8b are connected in series to each other and the series connection of the resistors 8a and 8b is connected in parallel with the capacitor 5. A divided voltage Vo corresponding to the reference voltage E is derived from the junction between the resistors 8a and 8b which divide the output voltage Eo. Reference numeral 9a denotes a hysteresis circuit for controlling an oscillation condition of the whole circuit. An operational amplifier 9b which functions as a differential amplifier or a comparator produces a switching instruction signal SS, which is applied to the transistr 3. The hysteresis circuit 9a receives the switching instruction signal and the reference voltage E from the reference power source 7. The hysteresis circuit 9a generates a hysteresis voltage Vh which varies on both sides of the reference voltage E within a constant voltage range ΔV in synchronism with the switching signal SS. The waveform of the voltage Vh is indicated by the broken line in FIG. 2.

The operational amplifier 9b receives both the hysteresis voltage Vh and the above-described divided voltage Vo to generate the switching instruction signal SS which turns on the transistor 3 when the hysteresis voltage Vh is higher than the divided voltage Vo, and turns off when the hysteresis voltage Vh is lower than the divided voltage Vo. As shown in the lower portion of FIG. 2, the hysteresis voltage Vh has a rectangular waveform, while the divided voltage Vo has a triangular waveform which rises when the transistor 3 is turned on, and falls when the transistor 3 is turned off. At an intersection between the voltage waveforms Vh and Vo, the output of the operational amplifier 9b is reversed and the switching instruction signal SS is generated to turn on or off the transistor 3.

If the output voltage Eo happens to rise above a normal level, the level of the divided voltage Vo shown in FIG. 2 rises as illustrated by the dash-and-dotted line, so that the intersection between the upper level of the hysteresis voltage Vh and the divided voltage Vo; that is, the time point at which the transistor 3 is turned off is advanced, and the time point at which the transistor 3 is turned on and which is determined in accordance with the lower level of the hysteresis voltage Vh and the divided voltage Vo is delayed. That is, when the output voltage Eo is higher than the normal level, the "ON" time of the transistor 3 is short and the "OFF" time is increased, so that the level of the output voltage Eo is decreased. Thus, it is apparent that when the output voltage Eo is lower than the normal level, the "ON" time of the transistor 3 is extended and the "OFF" time is shortened, so that the output voltage Eo is increased.

In this manner, the divided voltage Vo corresponding to the output voltage Eo is limited between the upper and lower level of the reference voltage E; that is, it is limited within the range ΔV of the reference voltage E. As a result, even if the power voltage Ei varies, the output voltage Eo is maintained substantially at a constant voltage containing some ripple or pulsating component.

However, in the case of the above-mentioned conventional circuit, the hysteresis width ΔV, that is, the above-mentioned voltage range derived from the hysteresis circuit 9a is likely to vary. As a result, the control characteristic of the circuit is likely to vary. More particularly, the hysteresis circuit 9a and the operational amplifier 9b establish a closed loop and the operational amplifier 9b having a high gain of the order of thousands or ten thousands is used in order to improve the control characteristics, so that the hysteresis width ΔV tends to vary in response to a slight variation in the control characteristics. As a consequence, the constant-voltage-accuracy of the output voltage tends to be affected. As is well known in the art, the gain of the operational amplifier tends to be affected by temperature variations especially in the case of a high gain. Furthermore, it is also apparent that when the hysteresis width ΔV varies, the period of the switching instruction signal SS and consequently the "ON-OFF" period of the transistor 3 varies, so that the operation frequency of the voltage converter also tends to vary.

Thus, the conventional circuit has a problem of maintaining the stable operation as described above, and in addition there is another problem that the hysteresis circuit 9a is complicated in construction, so that its manufacturing cost is expensive in the case of the mass-production of the voltage converters. Furthermore, in the circuit of the type described above, the setting of the hysteresis voltage ΔV which defines the upper and lower limits of voltage control cannot be eliminated because of the operation principle of the circuit. As a result, there has been a strong demand for improving or overcoming the above and other problems encountered in the conventional DC converters.

SUMMARY OF THE INVENTION

In view of the above, one of the objects of the present invention is to provide a step-down chopper type DC voltage converter which is stable and reliable in operation and is simple in construction.

To the above and other ends, a DC voltage converter comprising:

circuit switching means for establishing or interrupting a load current circuit which connects a DC power source to a load to supply a load current to the load;

differentiating means connected in series to the load current circuit for producing a voltage drop corresponding to a differentiated value of the load current;

integrating means connected in parallel with the load via an output terminal for outputting, as an output voltage to be supplied to the load, a voltage corresponding to an integrated value of a current flowing through the integrating means;

control width setting means for setting a width defined by upper and lower limits for controlling the output voltage in accordance with the voltage drop derived from the differentiating means;

ripple detection means receiving the output voltage delivered from the integrating element and for detecting a ripple caused by an "ON-OFF" operation of the circuit switching means;

output-reference-level setting means for setting a reference voltage of the output voltage; and switching control means receiving a width signal corresponding to the width and a ripple signal corresponding to the ripple for forming a switching instruction to the circuit switching means, so that a variation in the output voltage is limited within the width.

Here, the DC voltage converter may further comprise means for producing a signal representative of a divided voltage of the output voltage, the divided voltage being compared with the reference voltage determined by the output-reference-level setting means.

The signal representative of the divided voltage may be derived from the output terminal, and the signal may be combined with the width signal by the control width setting means to obtain a combined signal which is applied to the switching control means.

The output-reference-level means may include a zener diode which produces the reference voltage, and a feed circuit for supplying a current to the zener diode from the output terminal.

The feed circuit for the zener diode may also function as the ripple detection means.

According to the present invention, a special hysteresis circuit for determining the upper and lower limits of the output voltage when controlling the output voltage and the hysteresis width therebetween is eliminated and instead the upper and lower limits for controlling the output voltage are determined based on the voltage drop across a reactor through which the load current flows from a power source to a load. From the standpoint of the function of the reactor, it is a differentiating circuit element which produces a voltage drop (Ldi/dt) corresponding to the differentiated value of the load current flowing therethrough. In addition, it is advantageous that in response to "ON" or "OFF" operation of the transistor which permits or interrupts the load current, the freewheeling diode is turned on or off. In response to this "ON-OFF" operation, a step-like and discontinuous voltage drop occurs across the reactor which accomplishes the differentiation operation. Thus, according to the present invention, the voltage drop produced by the differentiating circuit element in response to the "ON-OFF" operation of the circuit is utilized as a source for causing the hysteresis effect.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
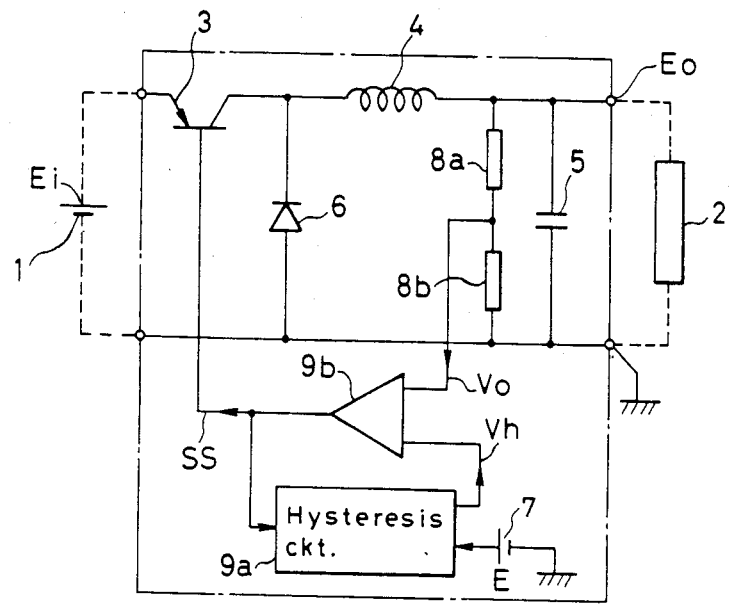
FIG. 1 is a circuit diagram showing an example of a prior art step-down chopper type DC-DC converter.
Figure 2:
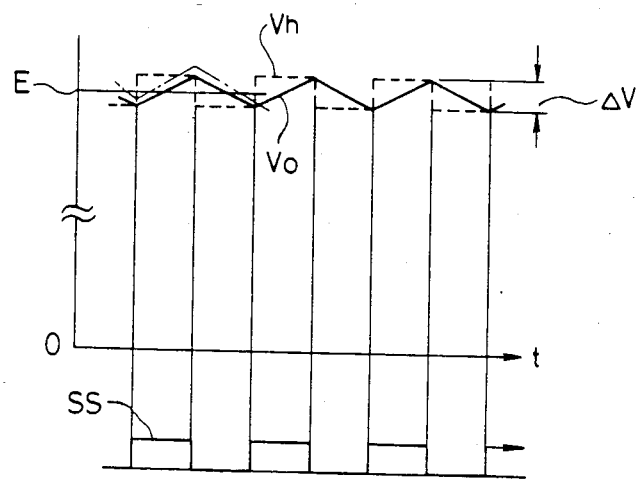
FIG. 2 illustrates various signal waveforms at various portions in the circuit shown in FIG. 1 to explain the mode of operation thereof.
Figure 3:
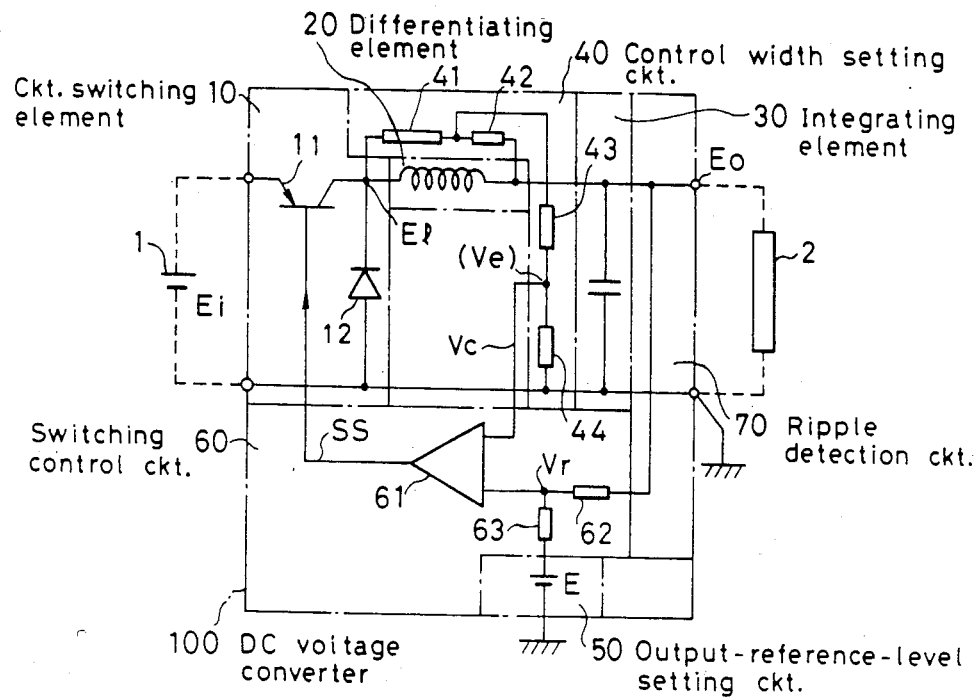
FIG. 3 is a circuit diagram showing an embodiment of a DC voltage converter in accordance with the present invention.

FIG. 3 shows a fundamental embodiment of a step-down chopper circuit in accordance with the present invention. The underlying principle of the present invention will be described below with reference to FIGS. 3 and 4. In FIG. 3, a circuit switching element 10 includes a semiconductor switch 11 such as a transistor for establishing or interrupting a load current to be supplied from the power source 1 to the load 2 and a freewheeling diode 12 which is turned on to establish a return path for the load current in response to the interruption of the switch 11. A differentiating element 20 consists of, for instance, a reactor and is inserted in series in the load current circuit between the switch 11 and the load 2, so that a voltage drop in the step-down chopper circuit is produced. An integrating element 30 connected in parallel with the output terminals of the load 2 can be, for instance, a conventional capacitor and functions to stabilize the output voltage as is well known in the art.

Figure 4:
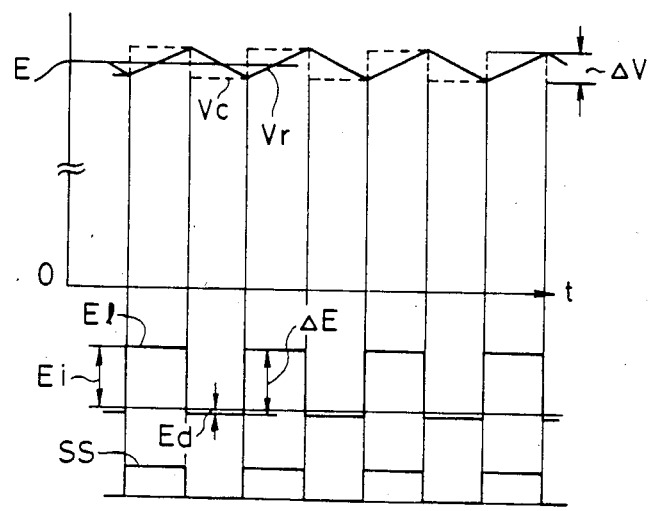
FIG. 4 illustrates various signal waveforms at various portions in the circuit shown in FIG. 3 to explain the mode of operation thereof.

FIG. 4 illustrates the waveforms used to explain the mode of operation of the first embodiment. In FIG. 4, there is shown a waveform of the potential El at the input terminal of the differentiating element 20 actuated in response to the "ON-OFF" operation of the circuit switching element 10. Below the potential El is shown a switching instruction signal SS. When the switching instruction signal SS is "ON" and hence when the semiconductor switch 11 is turned on, the potential E1 at the input terminal is substantially equal to the voltage Ei derived from the power source 1. Here, it is to be noted that the forward voltage drop is neglected.

However, when the semiconductor switch 11 is turned off, the load current flows through the freewheeling diode 12 into the input terminal, so that the potential E1 is equal to the forward voltage drop Ed across the diode 12. More particularly, when the semiconductor switch 11 is switched from the "ON" state to the "OFF" state, the potential E1 at the input terminal of the differentiating element 20 discontinuously varies stepwise, with a step amplitude substantially equal to the input voltage Ei. On the other hand, when the semiconductor switch 11 is switched from the "OFF" state to the "ON" state, the potential E1 at the input terminal of the differentiating element 20 varies stepwise, even though the direction of variation is reversed.

The potential at the output terminal of the differentiating element 20 is the output voltage Eo which is stabilized by the integrating element 30 and is substantially constant independently of th "ON-OFF" operation of the semiconductor switch 11, if a ripple or pulsating current is neglected. It follows, therefore, that the voltage drop across the differentiating element 20 has a substantially rectangular waveform as illustrated in FIG. 4.

The voltage width $\Delta E$ of the rectangular waveform itself is too wide to use as a voltage width between the upper and lower limits by which the output voltage Eo is controlled. Therefore, a control width setting circuit 40 having two voltage divider resistors 41 and 42 is provided as shown in FIG. 3 to divide the voltage width $\Delta E$ in accordance with a desired division ratio, so that a signal for defining a width between the upper and lower limits of the hysteresis waveform, i.e., a rectangular waveform having a narrower width is produced. It is to be noted that the width between the upper and lower limits is selected at a low value lower than an allowable width of a periodical variation of the output voltage Eo and is, for instance, less than 0.1V. The width between the upper and lower limits thus determined merely corresponds to a decreased value of the voltage width $\Delta E$ substantially equal to the input voltage Ei, so that the width varies only within the voltage variation range of the power source 1 and consequently the variation width can be considerably decreased as compared with the hysteresis voltage obtained in the conventional circuit. In this case, it is apparent that instead of the voltage divider resistors 41 and 42, a tap is provided at any desired point of the reactor coil which functions as the differentiating element 20.

The above-mentioned voltage width between the upper and lower limits may be in general an extremely low value, so that the value of the voltage divider resistor 42 may be considerably lower than that of the other resistor 41. Accordingly, the potential at the junction between the resistors 41 and 42 is substantially equal to the output voltage Eo. Therefore, the potential at said junction can be further divided by a voltage divider consisting of resistors 43 and 44 to derive a signal Vc having a level corresponding to that of the output signal Eo form the junction between the resistors 43 and 44.

Therefore, the signal Vc is a voltage obtained by combining the rectangular waveform having the voltage width $\Delta V$ between the upper and the lower limits with the divided voltage Ve obtained by dividing the output voltage Eo, as illustrated by the broken line in FIG. 4. The signal Vc is applied to one of input terminals of an operational amplifier 61 incorporated into a switching control circuit 60 to be described below.

A ripple detection circuit 70 is provided in order to obtain a ripple signal Vr illustrated by the solid line in FIG. 4 which is compared with the combined signal Vc. In principle, the ripple signal Vr may be derived from any suitable point at which the ripple signal Vr can be detected in response to the "ON-OFF" operation of the circuit switching element 10. In the case of the first embodiment shown in FIG. 3, the ripple signal Vr is derived from the output voltage Eo. As shown in FIG. 4, the ripple component in the output signal Eo has a triangular waveform due to the provisin of the integrating element 30 and hence it is advantageous to determine the "ON" and "OFF" timings of the circuit switching element 10 from the intersection points of the ripple signal with the upper and lower limits of the voltage width $\Delta V$, respectively.

An output-reference-level setting circuit 50 is provided to determine the level of the output voltage Eo and in the first embodiment, the circuit 50 is shown as the most simple form of battery having a reference voltage E.

The circuit 50 is connected in series to one resistor 63 which is connected to the other resistor 62 to constitute a voltage divider for dividing the detected value derived from the ripple detection circuit 70. Thus, the reference voltage E is combined with the ripple signal Vr, so that the combined voltage is applied to the other input terminal of the operational amplifier 61 in the switching control circuit 60. The operational amplifier 61 compares the ripple signal Vr with the combined signal Vc described above to issue the switching instruction signal SS, which determines the "ON" timing and the "OFF" timing, to the circuit switching element 10, i.e., to the gate of the transistor 11, as illustrated in the lower portion of FIG. 4. The mode of operation and the function for controlling the voltage of the operational amplifier 61 are substantially similar to those of the conventional operational amplifier described above. The operation frequency of the circuit is determined at the step of comparing the voltage width $\Delta V$ with the ripple signal Vr by the operational amplifier 61.

Further, it is noted that it is not always necessary to obtain the divided voltage Ve of the output voltage Eo to be compared with a voltage level determined by the reference voltage E from the circuit 40 for setting the control width in the manner described above. In the case of deriving the ripple signal Vr from the output voltage Eo, the divided voltage Ve can also be obtained from the ripple detecting circuit 70.

Here, it is also noted that it is not always necessary to combine the voltage width $\Delta V$ with the divided voltage Ve or to combine the ripple signal Vr with the reference voltage E. In other words, it is sufficient that the voltage width $\Delta V$ and the ripple signal Vr are compared with each other at the level of the reference voltage E by the switching control circuit 60, so that the switching instruction signal SS is generated. In this manner, it becomes easy to design and construct a circuit arrangement capable of accomplishing the required function by combining the various signals in accordance with the conventional technique.

A second embodiment of the present invention will be described with reference to FIGS. 5 and 6. Here, the same reference numerals are used to designate parts similar to those in FIGS. 3 an 4.

Figures 5, 6:
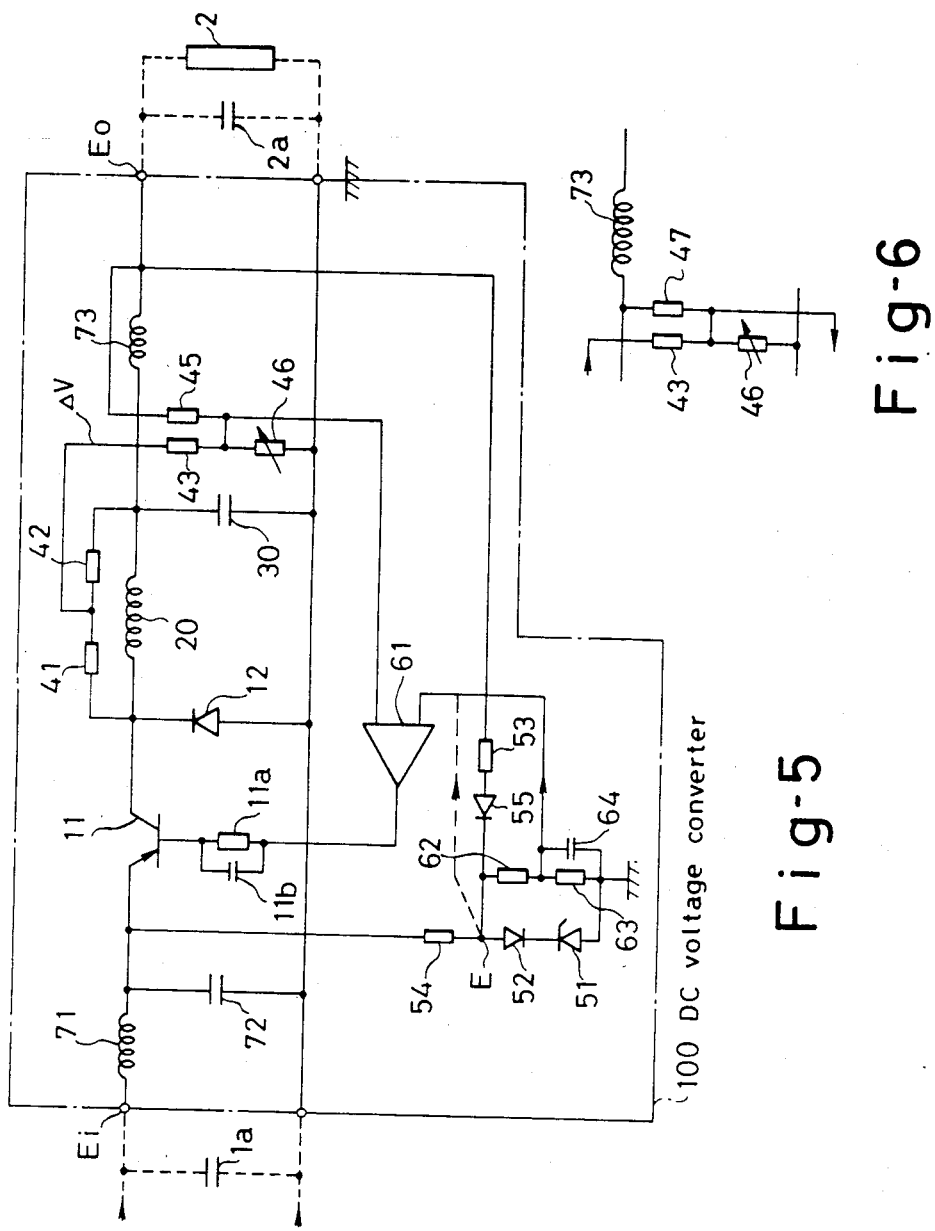
FIG. 5 is a circuit diagram showing another embodiment of the present invention.
FIG. 6 is a circuit diagram showing another embodiment of a circuit portion for setting a control width and producing a divided voltage of the output voltage in the circuit shown in FIG. 5.

In FIG. 5, the DC voltage converter or a DC—DC converter in accordance with the present invention generally indicated by the reference numeral 100 includes component parts in the portion surrounded by the dash-and-dotted line. The converter 100 receives an input voltage Ei at two input terminals from the DC power source 1 (not shown) and outputs an output voltage Eo which is maintained at a constant level, to the load 2 through the two terminals of the converter 100.

A reactor 71 and a capacitor 72 arranged on the input side constitute a filter which prevents the transmission of switching noise resulting from the "ON-OFF" operation of the semiconductor switch 11 to the power source 1. Further, for the same purpose of ensuring safety, another capacitor 1a is connected in parallel with the power source 1 as indicated by the imaginary line.

A reactor 73 on the output side is disposed in order to suppress the ripple component in the output voltage Eo and it is usual that a capacitor 2a is also connected in parallel with the load 2 as indicated by the imaginary line in order that the ripple component is absorbed by the capacitor 2a.

In this embodiment, a transistor is used as the semiconductor switch 11 and a base resistor 11a is connected to the base of the transistor 11 in order to determine an amount of the base current flowing from the emitter of the transistor 11 to the operational amplifier 61. A base capacitor 11b which is connected in parallel with the base resistor 11a is a speed-up capacitor for performing faster turn-on of the transistor 11.

A signal for determining the voltage width ΔV between the upper and lower limits is derived from the junction between the voltage divider resistors 41 and 42 which are connected to the respective ends of the reactor 20 which functions as a differentiating element. A divided voltage signal is derived from the output terminal of a second reactor 73 in this embodiment. The combination of a resistor 43 and a variable resistor 46 functions as a voltage divider for obtaining a signal which determines the voltage width ΔV between the upper and lower limits and the voltage width ΔV is determined by adjusting the variable resistor 46. The divided voltage signal is applied to a resistor 45, so that the divided voltage signal is combined with the voltage width ΔV and then the combined signal is further applied to one input terminal of the operational amplifier 61. Further, the divided voltage signal may be derived from a resistor 47 connected to the input terminal of the second reactor 73, as shown in FIG. 6.

A circuit for obtaining the reference voltage E includes a zener diode 51 and a diode 52 connected in inverse-series with the zener diode 51 and a zener current is supplied to the zener diode 51 through a resistor 53 and a diode 55 from the output terminal of the constant voltage supply. The diodes 52 and 55 are used to prevent a reverse current when the output voltage Eo becomes zero due to a failure such as short-circuit. The input voltage Ei is applied to the zener diode 51 through the resistor 54 and the diode 52, so that the reference voltage E is produced, even when the output voltage Eo does not rise sufficiently at the time that the energization of the circuit is started. In this manner, the reference voltage E appears at a point E in FIG. 5. Since the zener diode 51 is energized from the output terminal side, the ripple component in the output voltage Eo is also supplied to the point E and is divided by a voltage divider consisting of resistors 62 and 63. The divided ripple component is applied to the other input terminal of the operational amplifier 61.

A capacitor 64 connected in parallel with the resistor 63 is a ballast capacitance for protecting the reference voltage and the ripple signal applied to the other input terminal of the operational amplifier 61 from spike noise or the like. It is apparent that the ripple signal can be directly derived from the zener diode circuit as indicated by the imaginary line without using the voltage divider.

Variations in output voltage Eo synchronized with the operation frequency of the circuit are extremely small and accordingly it is sufficient that the ripple signal is extremely small. Therefore, the circuit in accordance with the present invention can be operated in a stabilized manner at a frequency of hundreds KHz even by a voltage ripple superposed on the zener voltage.

According to the present invention, the conventional hysteresis circuit which is not stable in operation and is expensive in cost can be eliminated. Instead of the hysteresis circuit, the present invention is based on the fact that the hysteresis voltage is generated by a differentiating element such as a reactor in response to the "ON-OFF" operation of the circuit switching element and the present invention effectively utilizes this hysteresis voltage. Therefore, the problem that the hysteresis voltage for determining the upper and lower limits of the operation of the conventional circuit becomes unstable due to variations in gain of the operational amplifier can be substantially overcome. Since the present invention does not require a hysteresis circuit, this omission of the hysteresis circuit is advantageous in operation and cost. As described above, according to the present invention, the signal for determining the voltage width between the upper and lower limits which is obtained from the differentiating element is produced by the input voltage and the load current flowing through the differentiating element. Therefore, the circuit in accordance with the present invention is very stable, highly reliable and dependable in operation as compared with the prior art circuit. In addition, the signals have a substantially completely rectangular waveform, so that they are suitably used as the basis for the voltage control in this type of step-down chopper type circuit.

As described above, according to the present invention, the performance and stability of the step-down chopper type chopper are improved and the step-down chopper type chopper can be mass-produced at a lower cost.

What is claimed is:

1. A DC voltage converter comprising:
   circuit switching means for establishing or interrupting a load current circuit which connects a DC power source to a load to supply a load current to said load;
   differentiating means connected in series to said load current circuit for producing a voltage drop corresponding to a differentiated value of said load current;
   integrating means connected in parallel with said load via an output terminal for outputting, as an output voltage to be supplied to said load, a voltage corresponding to an integrated value of a current flowing through said integrating means;
   control width setting means for setting a width defined by upper and lower limits for controlling said output voltage in accordance with said voltage drop derived from said differentiating means;

ripple detection means receiving said output voltage delivered from said integrating element and for detecting a ripple caused by an "ON-OFF" operation of said circuit switching means;

output-reference-level setting means for setting a reference voltage of said output voltage; and switching control means receiving a width signal corresponding to said width and a ripple signal corresponding to said ripple for forming a switching instruction to said circuit switching means, so that a variation in said output voltage is limited within said width.

2. A DC voltage converter as claimed in claim 1, further comprising means for producing a signal representative of a divided voltage of said output voltage, said divided voltage being compared with said reference voltage determined by said output-reference-level setting means.

3. A DC voltage converter as claimed in claim 2, wherein said signal representative of said divided voltage is derived from said output terminal, and said signal is combined with said width signal by said control width setting means to obtain a combined signal which is applied to said switching control means.

4. A DC voltage converter as claimed in claim 1, wherein said output-reference-level means includes a zener diode which produces said reference voltage, and a feed circuit for supplying a current to said zener diode from said output terminal.

5. A DC voltage converter as claimed in claim 4, wherein said feed circuit for said zener diode also functions as said ripple detection means.

* * * * *